US007112741B2

(12) United States Patent
Hechler

(10) Patent No.: US 7,112,741 B2
(45) Date of Patent: Sep. 26, 2006

(54) ELECTRONIC MODULE

(75) Inventor: Jakob Hechler, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/966,206

(22) Filed: Oct. 15, 2004

(65) Prior Publication Data

US 2005/0085137 A1 Apr. 21, 2005

(30) Foreign Application Priority Data

Oct. 18, 2003 (EP) .................................. 03023448

(51) Int. Cl.
*H02G 3/08* (2006.01)
*H01R 9/22* (2006.01)

(52) U.S. Cl. ....................... 174/50; 174/520; 174/70 B; 439/709; 439/76.2; 361/611

(58) Field of Classification Search .................. 174/50, 174/52.1, 52.2, 70 B, 71 B, 72 B, 88 B, 174/99 B, 65 R; 439/76.1, 76.2, 98, 607, 439/610, 709, 212, 721, 949, 810; 361/611, 361/637, 641, 648, 669, 729, 743, 775, 638
See application file for complete search history.

(56) References Cited

U.S. PATENT DOCUMENTS 4,505,534 A * 3/1985 Shannon ...................... 439/810
5,203,724 A * 4/1993 Casey ......................... 439/792
5,213,518 A * 5/1993 Weidler ....................... 439/211
5,600,536 A * 2/1997 Newsome et al. ........ 174/72 B
6,066,006 A * 5/2000 Shaw .......................... 439/736
6,545,861 B1 * 4/2003 Hayes et al. ............... 174/52.1
6,595,789 B1 7/2003 Oota et al.

FOREIGN PATENT DOCUMENTS

| | | |
|---|---|---|
| CH | 658 549 | 11/1986 |
| EP | 0 763 873 | 3/1997 |

* cited by examiner

*Primary Examiner*—Angel R. Estrada
(74) *Attorney, Agent, or Firm*—Cohen, Pontani, Lieberman & Pavane

(57) ABSTRACT

An electronic module includes a housing, an electronic circuit arrangement arranged therein, and at least one cylindrical bus bar which is connected to the circuit arrangement and which projects through an opening formed at the housing to form a connection area with electric connection leads. In order to provide a module with strain relief that is protected against external influences, a substantially plate-shaped connection lug whose radial extension exceeds that of the bus bar is formed at the bus bar, and a connection unit is arranged at the housing in order to form the connection area. The connection unit has a base plate which contacts the housing and which has an opening through which the connection lug is guided at least partially and can be received in a positive engagement by the connection unit. The bus bar is secured in position by a closure element that is arranged at the connection unit on the housing side.

20 Claims, 8 Drawing Sheets

ELECTRONIC MODULE

BACKGROUND OF THE INVENTION

1. Field of the Invention

The invention is directed to an electronic module of the type including a housing having an opening, an electronic circuit in the housing, and a substantially cylindrical bus bar connected to the circuit and extending through the opening for connection to an electrical lead.

2. Description of the Related Art

Apart from connections for control signals, a module of the type mentioned above, which can be, for example, an inverter for a polyphase machine, has a plurality of high-current connections which are connected on one hand to a power source, e.g., to a vehicle battery or an electric generator, and on the other hand to an electric consumer, e.g., a starter in a vehicle with an internal combustion engine or an electric traveling mechanism in an electric or hybrid vehicle. In an electronic module of this kind, it is generally required that its electric connection area is designed for transmitting high electric currents in the range of several hundred amperes or outputs of several kilowatts in a safe and stable manner. In particular, it must be ensured that mechanical loads occurring in the connection area are not transmitted to the electronic circuit located in the housing, which would result in damage to the latter or a loosening of the connection to the bus bars located therein. Further, when the electronic module is arranged in an engine compartment of a motor vehicle, care must be taken that the connection area and the openings by which the electric leads enter the module are protected from external influences such as dust, splashed water and moisture.

SUMMARY OF THE INVENTION

It is the object of the invention to provide an electronic module with a connection unit which ensures reliable operation.

In the electronic module according to the invention, a plate-like connection tug is fixed to the end of the bus bar outside the housing, the lug having a radial dimension which exceeds the radial dimension of the bus bar. A connection unit provides a connection between the connection lug and the electrical lead, the connection unit having a base which contacts the housing and an opening through which the connection lug is guided. The connection unit positively engages the lug, and a closure element secures the bus bar in position in the connection unit.

The solution according to the invention provides an electronic module in which the connection lugs and, therefore, the bus bars are mechanically fixed in position in all directions without the engagement of fastening means for the connection of additional connection leads. Therefore, a preassembled unit can be provided even before the bus bars are installed in the electronic module, the position of the bus bars being fixed with respect to one another and, during further assembly, also with respect to the circuit arrangement, so that no additional assembly means are required to position the bus bars when making the connection of the bus bars to the circuit arrangement. Accordingly, manual orientation of the bus bars can be dispensed with. A particular advantage of the arrangement is that one or all of the bus bars or the electronic circuit arrangement can be exchanged relatively simply and quickly. The entire assembly process is therefore eminently suitable for automation. Due to the fact that the connection element of the bus bar is constructed as a connection lug and the connection lug is received in a positive engagement by a connection unit that is fixedly connected to the housing, the circuit arrangement arranged in the interior of the housing can be reliably protected from tensile, compressive or shearing stresses acting on the connection leads. By providing a closure element, dirt and dust are prevented from entering at the same time.

Further protection of the electronic module against external influences, more precisely, the penetration of liquids such as lubricants in the area of the engine compartment, hydraulic liquid or water and vapor, can be achieved when a seal, e.g., an O-ring seal, is provided at the bus bar in the area of the housing opening. The ring groove is advantageously formed by the housing and the closure element or by the housing and at least partially by the connection lug. In a particularly advantageous manner, the ring groove has a conical surface which tapers inward so that the seal is compressed radially inward when the connection unit is mounted and is pressed between the groove and the bus bar.

Depending on the position of the electric connection leads which are fed to the electronic module, the connection lugs of the bus bar(s) are arranged either in their direction of extension or at an angle to the bus bar(s).

The closure element is preferably constructed as a bushing. This can be guided on the bus bar so that it can slide axially and so that the position of the bus bar can be fixed simply and quickly after the connection lug is inserted into the connection unit. Alternatively, the closure element can be constructed as a plate. Assembly can be facilitated when there is a plurality of bus bars by combining a plurality of closure elements to form a closure unit and the openings of the connection unit are closed simultaneously.

In a further development of the invention, the connection area has fastening means for connecting the bus bar to a connection lead, wherein the fastening means advantageously have at least one fastening element which can be received by the connection unit or the connection lug so as to be fixed with respect to rotation relative to it. This step obviates the need to apply a reaction torque by means of an additional tool when connecting a connection lead to a connection lug of the connection unit because, when a screw connection is carried out, this screw connection is produced by the connection unit in which a nut or, e.g., a hexagon screw is inserted in a positive engagement. The connection lug advantageously has an opening through which the fastening means can be guided. When the electronic module is arranged in a vehicle, the connection to the connection unit, which is preferably a screw connection, can be loosened by vibrations and the electronic module can be rendered inoperative, and the screw and nut can also be lost. In order to prevent such an occurrence, the fastening means are arranged at the connection unit so as to be protected against loss in that the screws and nuts are prevented from unintended loosening by cover caps or by recesses that are provided in the connection unit.

The connection unit advantageously has a mounting plate which projects from the base plate and in which recesses are formed for receiving the connection lugs in a positive engagement.

Insofar as the module comprises a plurality of bus bars, their connection areas may be insulated from one another at the connection unit by dividing walls.

A cover element may be provided for protecting a connection area and covers this connection area except for an outlet for a connection lead. A plurality of cover elements can also be combined to form a cover unit for this purpose.

For assembly of the electronic module, it has proven useful to construct the housing with a removable cover and to arrange the connection unit on the latter.

The connection unit is preferably made of a plastic, so that the connection part and the associated closure and cover elements can be manufactured economically by an injection molding process.

The process for assembling an electronic module comprises the following essential steps:

a) mounting the bus bar on the connection unit;

b) mounting the connection unit at the housing of the electronic module; and c) connecting the bus bar to the circuit arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
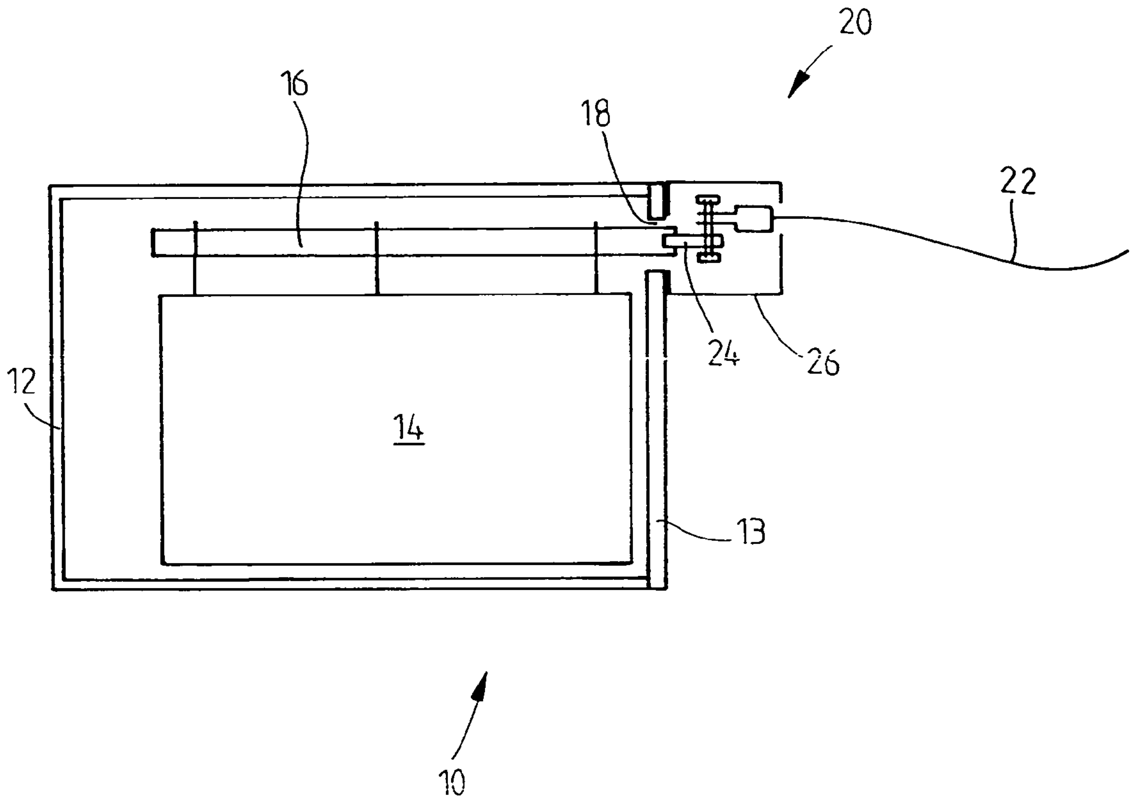
FIG. 1 is a schematic plan view of an electronic module.

FIG. 1 shows a schematic view of an electronic module 10 which comprises a housing 12 and an electronic circuit arrangement 14 arranged therein. The electronic circuit arrangement 14 is connected at a plurality of locations to one or more bus bars 16 which are preferably cylindrical and which project through an opening 18 formed at the housing 12 to form connection areas 20 with electrical connection leads 22 outside of the housing 12. For this purpose, the bus bar 16 has a connection lug 24 which is received by a connection unit 26 jointly with a connection lead 22 that is fed to the electronic module 10 and is connected to this connection lead 22. Further, the housing 12 has a removable housing cover 13, the connection unit 26 being fixedly arranged at this housing cover 13 by means of a screw connection which is not shown in the drawing.

Figure 2A:
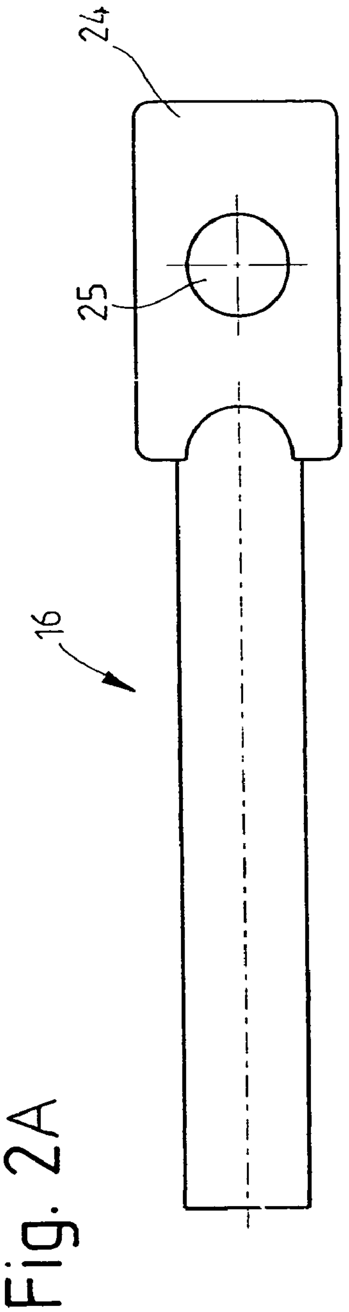
FIGS. 2A and 2B show a bus bar with a connection lug formed in its extension direction.
Figure 2B:
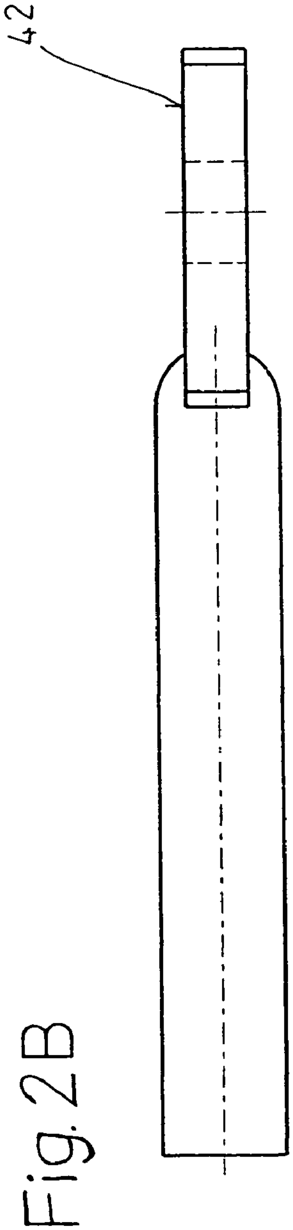

In the following, it will be described in detail how the bus bar 16 is arranged in the area of the housing opening 18 and the connection unit 26. First, FIGS. 2A and 2B show a cylindrical bus bar 16 which is made of copper and which has a diameter of 5 to 10 mm and a tinned surface. This bus bar 16 has a plate-shaped connection lug 24 at its end that is connected to the connection lead 22, this connection lug 24 likewise extending in direction of the bus bar 16. In this regard, it is important that the radial extension of the connection lug 24 exceeds that of the cylindrical portion of the bus bar 16 and that the housing opening 18 is greater than the diameter of the bus bar 16 but smaller than the radial dimension of the connection lug 24. Further, the connection lug 24 has an opening 25 for fastening means which are provided for connecting to the connection lead 22. This connection can be carried out, for example, by means of a bolt, a screw or, e.g., a rivet which is guided through the opening 25.

Figure 3:
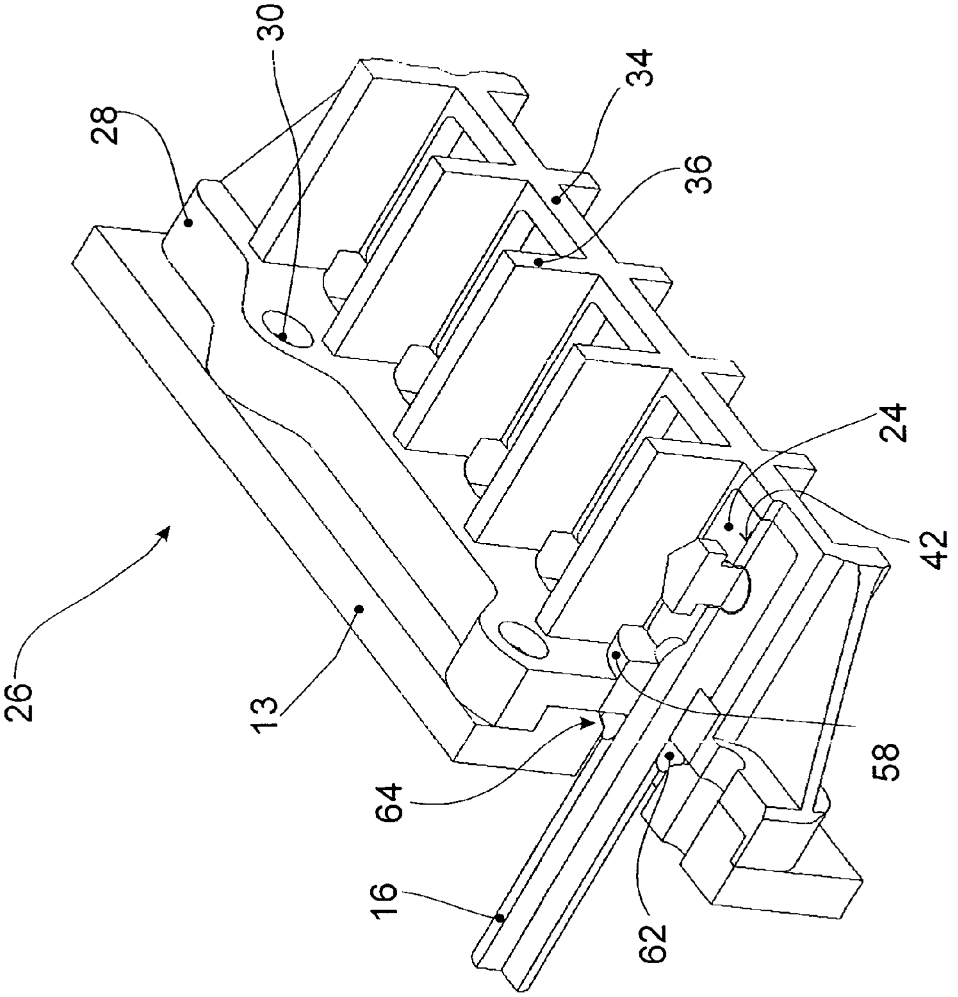
FIG. 3 is a perspective view of a connection unit with bus bars arranged thereon.
Figures 4A, 4B, 4C:
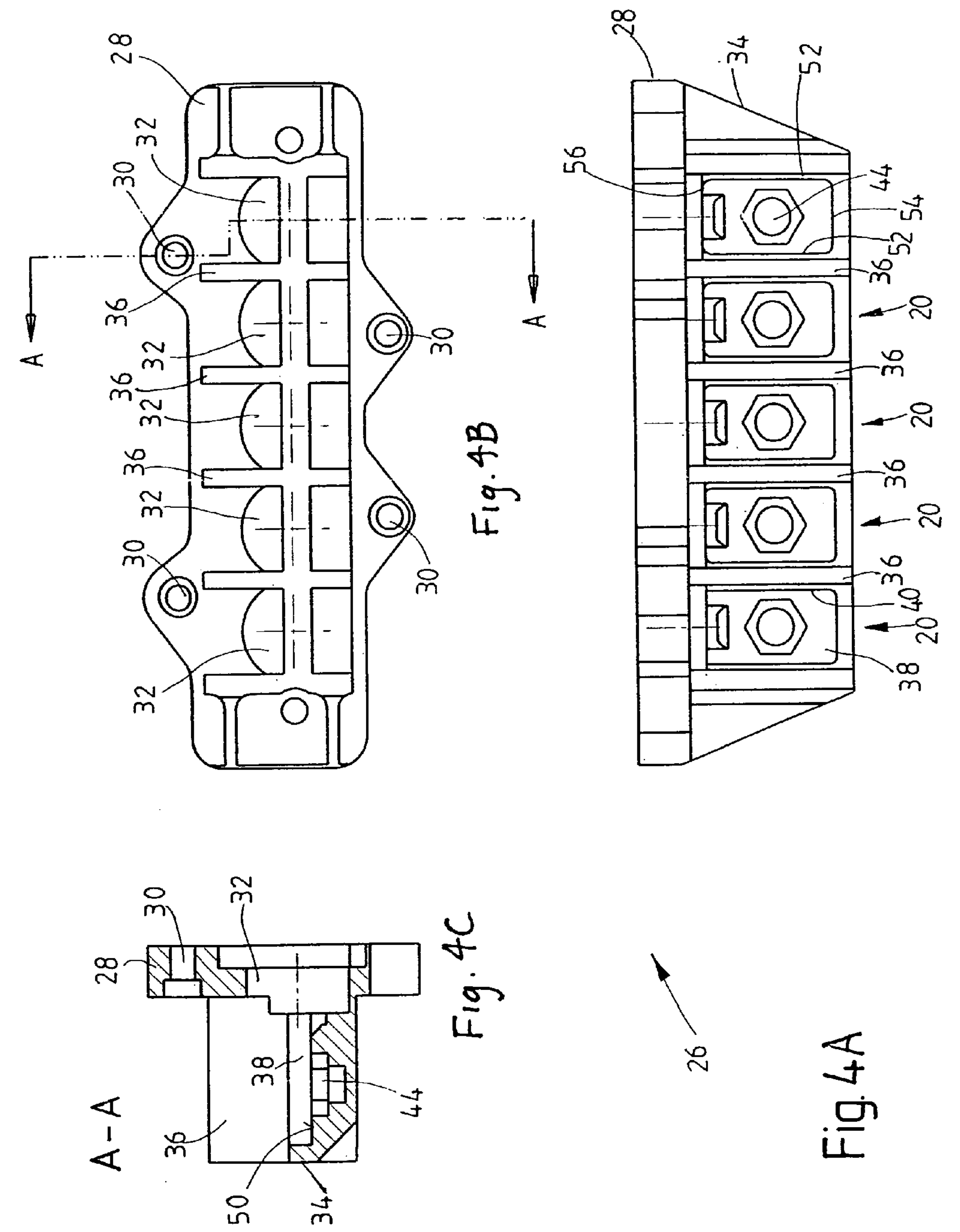
FIG. 4A is a plan view of a connection unit without a bus bar.
FIG. 4B is a side view of the connection unit of FIG. 4A.
FIG. 4C is a section view along the line A—A of FIG. 4B.
Figure 5B:
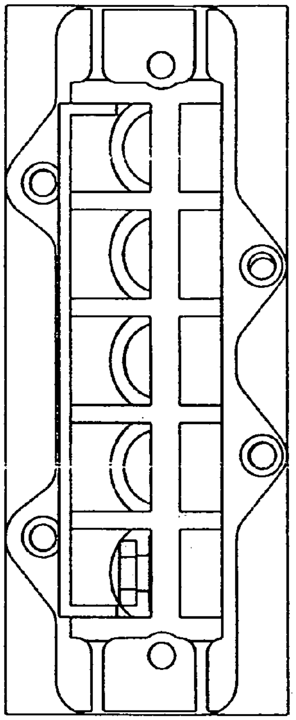
FIG. 5B is a side view of the connection unit of FIG. 5A.
Figure 5A:
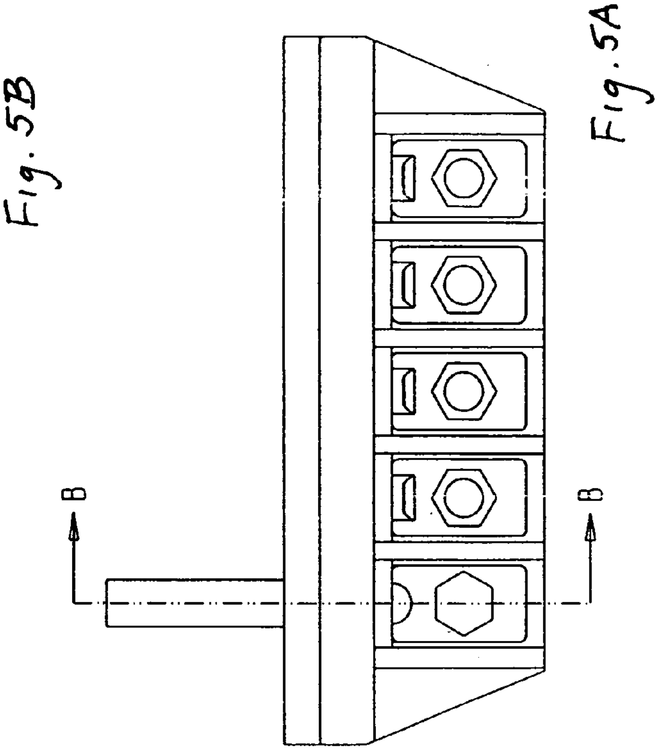
FIG. 5A is plan view of a connection unit with a bus bar.
Figure 5C:
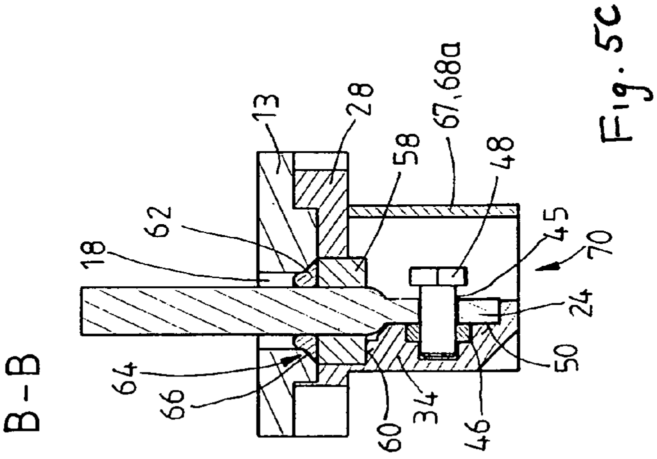
FIG. 5C is a section view along the line B—B of FIG. 5A.

FIG. 3 is a perspective view in partial section showing a bus bar 16 mounted at a connection unit 26. The connection unit 26, which is preferably made of plastic, has a base plate 28 at which a plurality of through-holes 30 are formed for screwing to the housing 12. Further, as is shown in the sectional view in FIG. 4C, a plurality of openings 32 are formed at the base plate 28 and are dimensioned in such a way that the connection lugs 24 of the bus bars 16 can be guided through them. At an approximately right angle to the base plate 28, the connection unit 26 has a mounting plate 34 which is provided for receiving the connection lugs 24 of the bus bars 16 and at which a plurality of connection areas 20 are provided and insulated from one another by dividing walls 36. A plurality of recesses 38 are provided at the mounting plate 34, their contour 40 being shaped in such a way that the connection lugs 24 of the bus bars 16 can be received by them in a positive engagement. The depth of the recesses 38 is selected in such a way that the surface 42 of a connection lug 24 to be contacted by a connection lead 22 terminates substantially flat with the wall area of a recess 38. Either a through-opening or, as is shown in FIGS. 4A and 4C, another recess 44 is formed inside the recess 38 in the area of the opening 25 of the connection lug 24, this other recess 44 being formed for receiving fastening means 45 in a positive engagement for connecting the bus bar 16 and connection lead 22. The recess 44 has a hexagonal inner contour for receiving a hexagon nut 46 or a hexagon screw head 48 (see FIGS. 5A–5C), the depth of the recess 44 corresponding at least to the height of the screw head 48 or nut 46, so that these elements can be arranged entirely in the recess 44. This ensures that the connection lug 24 can be supported on a base 50 of the recess 38 and on the nut 46 or screw head 48 along the entire surface. Alternatively, a throughopening can also be provided instead of the recess 44 for the fastening means 45, wherein the screw head 48 or the nut 46 can be inserted at the area of the mounting plate 34 remote of the connection lug 24. The nut 46 or the screw head 48 is therefore arranged in such a way that it cannot be lost and has no movement play. However, if a through-opening is provided in the area mentioned above, it proves useful to protect the fastening means 45 from falling out by means of a securing element. For example, a cover slide which is guided in a groove of the connection unit can be provided for this purpose.

In order to mount the bus bar 16 at the connection unit 26, the bus bar 16 is initially pushed through the opening 32 of the base plate 28 by its connection lug 24 diagonally at an angle from the left-hand side, with reference to FIG. 3, and is then lowered into the plane of the mounting plate 34, wherein the connection lug 24 is received by the recess 38 in a positive engagement. A movement of the bus bar 16 in the plane of the base plate 28 is safely prevented by lateral limiting surfaces 52, a front limiting surface 54 and a rear limiting surface 56 which is interrupted by the bus bar 16. Before inserting the bus bar 16, the fastening means 45 can also be inserted in its recess 44, if required, but this can also be carried out later when a through-opening is provided. A closure element 58 (FIGS. 3, 5) which is constructed in the present case as a plastic bushing 58 that can be guided axially on the bus bar 16 serves to secure the bus bar 16 in position in the connection unit 26. For this purpose, the bushing 58 has an inner diameter that is only slightly larger than the diameter of the bus bar 16 and the outer diameter of the bushing 58 is slightly smaller than the inner diameter of the through-opening 32 provided in the base plate 28. After the connection lug 24 is inserted into its recess 38, the free space remaining, which forms an annular gap in this example, can be closed toward the base plate 28 by an axial movement of the bushing 58. The position of the bus bar 16 in the connection unit 26 is securely fixed in all directions by means of this step.

As can be seen particularly clearly from FIGS. 3 and 5, one end face of the bushing 58 contacts a limiting surface 60 of the mounting plate 34 and the opposite end face terminates substantially flush with a contact surface of the base plate 28. With the connection unit 26 described thus far, a plurality of bus bars 16 can be positioned with respect to one another and also with respect to their connection positions at the electronic circuit arrangement 14, wherein the through-openings 18 of the bus bars 16 in the housing 12 are already protected against the penetration of coarse dirt. An even better protection against penetration of splashed water and moisture can be achieved when the bus bar 16 has a seal 62 in the area of the through-opening 18 as is shown in FIGS. 3 and 5. The seal 62 can be constructed, for example, as an O-ring seal and is arranged in a ring groove 64 formed by the housing 12 and the bushing 58. The ring groove 64 has a conical surface 66 which tapers inward so that the seal 62 is pressed radially inward when the connection unit 26 is mounted at the cover 13 and accordingly contacts the bus bar 16 and the groove 64 accompanied by pretensioning. Of course, the conical surface 66 can also be formed in the bushing 58 instead of in the housing opening 18.

After the subassembly formed by the bus bar 16 or bus bars 16 and the connection unit 26 is mounted at the housing 12 of the electronic module 10, the electrical connections of the bus bars 16 to the electronic circuit arrangement 14 can be produced, e.g., by welding, soldering or screwing. Following this, the connections to the electric connection leads 22 can be produced by the fastening means 45 arranged in the connection areas 20 in that these connection leads 22 preferably likewise have connection lugs with through-openings. Cover elements 67 which cover the connection area 20 up to an outlet area 70 for a connection lead 22 are used for outward protection of the connection areas 20. In order to reduce the quantity of parts, the plurality of cover elements 67 provided at a connection unit 26 are combined to form a cover unit **68*a* which is secured to the mounting plate 34, e.g., by a one-way locking connection, not shown in the drawing. The cover elements 67 and cover unit 68*a* also serve as additional protection against the loss of the fastening means 45**.

To summarize, the mounting of the bus bars 16 and their connection to connection leads 22 that are fed to the electronic module 10 from the outside is carried out by a first step in which the bus bars 16 are mounted at the connection unit 26, a second step in which the connection unit 26 is mounted at the housing 12 of the electronic module 10, a third step in which the bus bars 16 are connected to the circuit arrangement 14, and a final step in which the connection leads 22 are connected to the bus bars 16 at the connection unit 26.

Figure 6C:
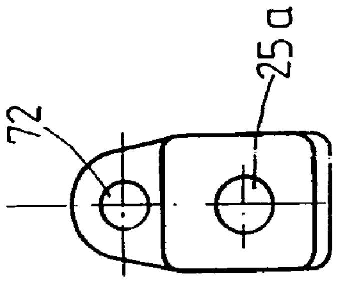
FIG. 6C is an end view.
Figure 6B:
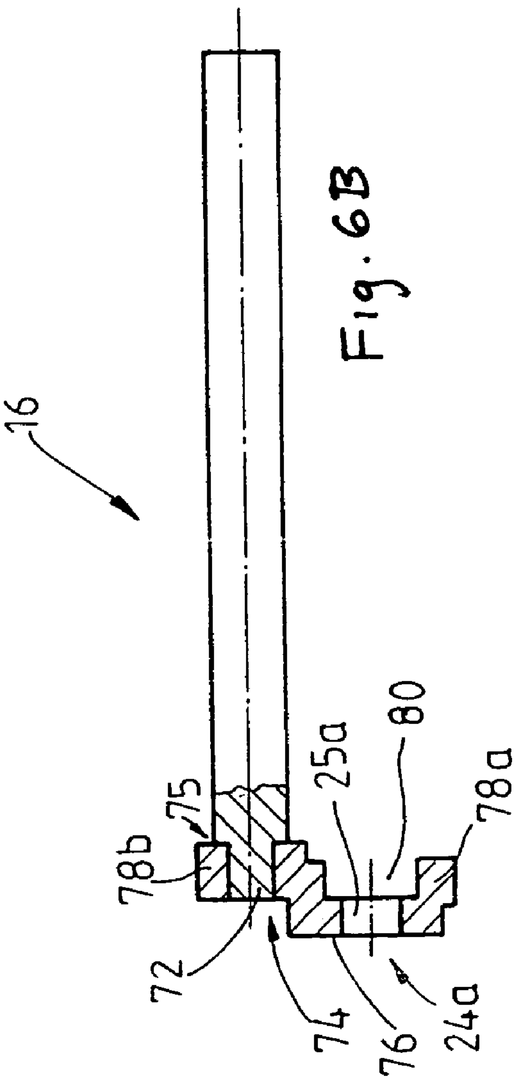
FIG. 6B is a partial side section view.
Figure 6A:
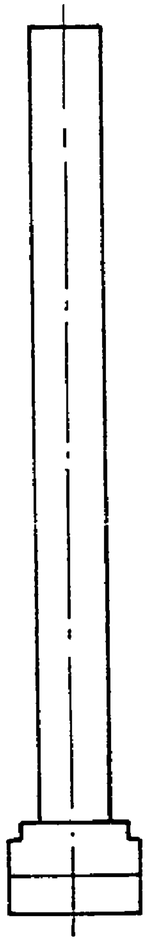
FIG. 6A is a plan view of a bus bar with a connection lug which is arranged at an angle.
Figure 7:
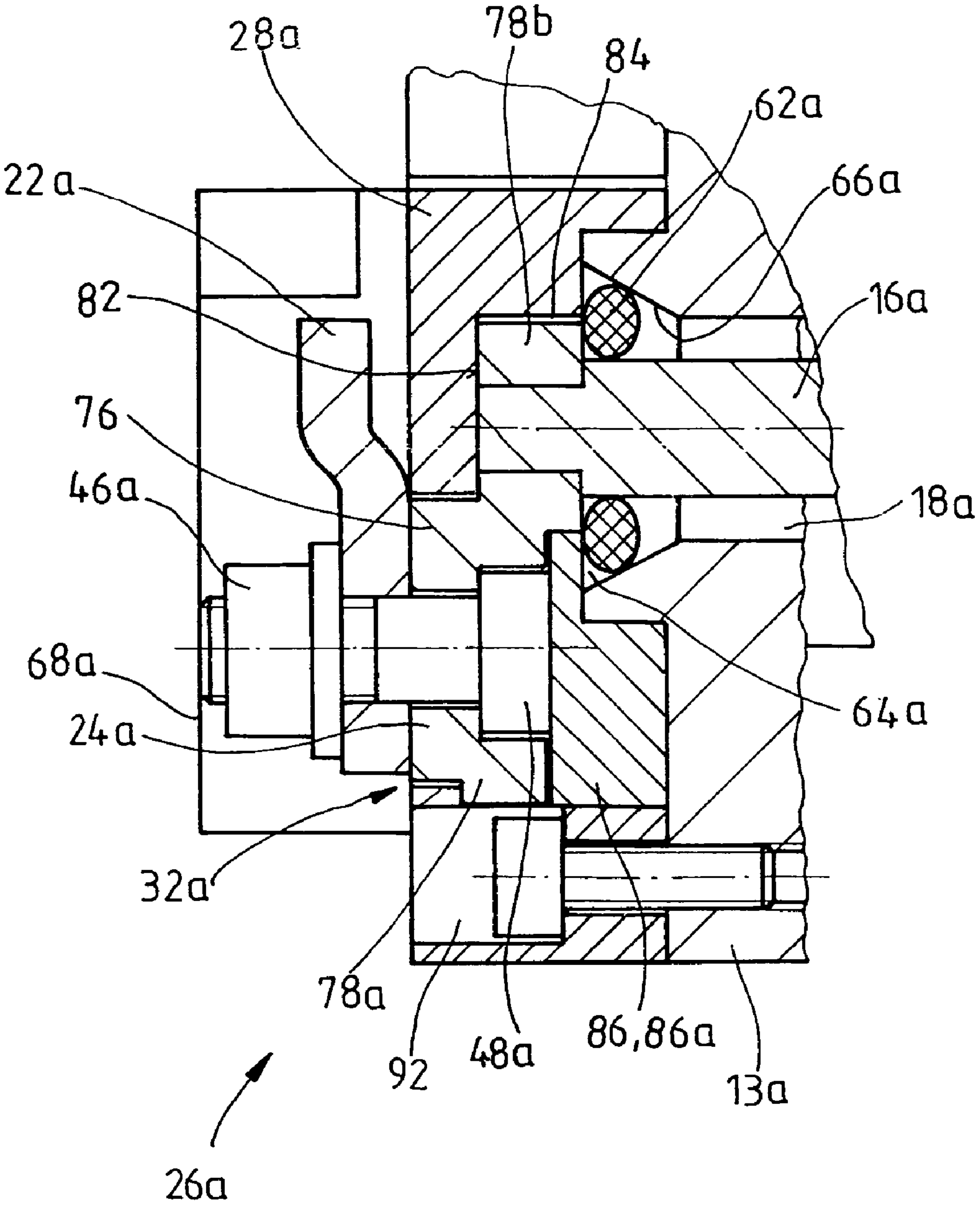
FIG. 7 is a sectional view through a connection unit with a bus bar according to FIG. 6.
Figure 8:
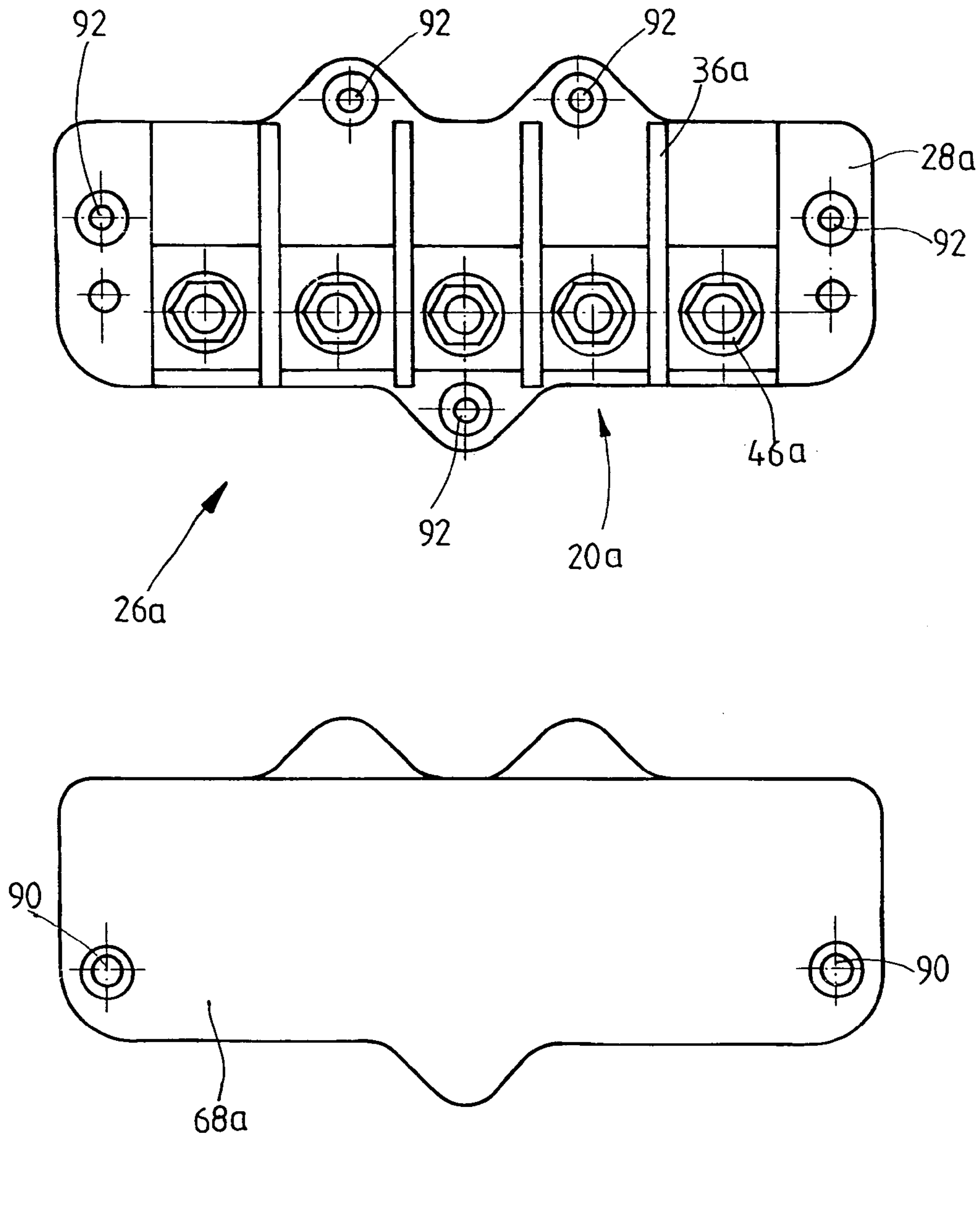
FIG. 8 is a top view of a connection unit according to FIG. 7 with a cover element.

FIGS. 6 to 8 show another embodiment example of the invention which differs from the example shown in FIGS. 2 to 5 in that the connection lug **24*a* is not arranged in the direction of extension of the bus bar 16*a*, but rather at an angle to the latter. FIGS. 6A–6C show a bus bar 16*a* which is again shaped cylindrically. A substantially plate-shaped connection lug 24*a* is arranged at one end of the bus bar 16*a* at an angle of approximately 90°. The bus bar 16*a* has a pin 72 for connecting to the connection lug 24*a*, which pin 72 projects into an opening 74 of a connection area 75 formed at the connection lug 24*a* and is fixedly connected to it by soldering. The connection lug 24*a* is angled and has a raised area 76 and areas 78*a*, 78*b* on either side that are lower with respect to the latter. An opening 25*a* is also arranged at this connection lug 24*a*, through which fastening means can be guided. The recess 80 formed between the areas 76 and 78*a*, 78*b* is dimensioned in such a way that a polygon screw head 48*a* or a polygon nut 46*a*** can be arranged therein so as to be fixed with respect to rotation relative to it.

The connection unit **26*a* shown in FIGS. 7 and 8 substantially comprises a base plate 28*a* in which recesses 32*a* are formed. The connection lugs 24*a* can be guided through these recesses 32*a* by their raised area 76. In FIG. 7, the connection lugs 24*a* contact a stop surface 82 of the base plate 28*a* by their areas 78*a*, 78*b*. The contour of a recess 84 formed in the base plate 28*a* is adapted to the contour of the connection lug 24*a* so that the latter can be inserted into the base plate 28*a* in a positive engagement by inserting from right to left with reference to FIG. 7, which prevents the bus bar 16*a* and connection lug 24*a* from rotating relative to one another. The connection lug 24*a* is secured against axial movement by a plate-shaped closure part 86 which is inserted at the housing side of the base plate 28*a* and closes the recess 80 which is formed as a receiving space for the fastening means, i.e., for a polygon screw head 48*a* shown in FIG. 7. The closure part 86, the connection lug 24*a* and the base plate 28*a* form a common sealing surface which, together with a tapering, conical surface 66*a* formed at the housing cover 13*a*, forms a ring groove 64*a* for an O-ring seal 62*a* which is tensioned radially inward when the connection unit 26*a* is mounted at the housing cover 13 and tightly contacts the bus bar 16. Instead of a closure element 86 constructed individually for each bus bar 16*a*, these closure elements 86 can also be combined to form a closure unit 86*a***.

The connection unit **26*a* according to FIG. 7 is shown in a top view in FIG. 8 and has a cover unit 68*a* which extends over all of the connection areas 20*a* that are separated by dividing walls 36*a*. The cover unit 68*a* has bore holes 90 for screwing to the base plate 28*a* and accordingly guarantees that nuts 46*a* for connecting the bus bar 16*a* and connection lead do not accidentally loosen and get lost. The base plate 28 is provided for screwing to the cover 13*a* by a plurality of bore holes 92 as is shown in FIG. 7**.

To assemble the unit, the bus bars **16*a* are first inserted by their connection lugs 24*a* into the recesses 84 at the base plate 28*a* up to the stop. The nut 46*a* or the screw head 48*a* is then inserted into the recess 80 of the connection lug 24*a* and the individual closure elements 86 or the closure plate 86*a* are/is then fitted into the base plate 28 so that the nut 46*a* or screw head 48*a* is covered. Further, the O-ring seal 62*a*** is fitted to the bus bar 62*a* and made to contact the connection lug 24*a*. This constructional unit can now be arranged at the housing cover 13*a* of the electronic module 10. In so doing, the bus bars 16*a* are guided through the openings 18*a* and the connection unit 26*a* is screwed to the housing cover 13*a*. The seal 62*a* accordingly securely contacts the bus bar 16*a* and the conical surface 66*a*. The housing cover 13*a* is then connected to the remaining housing part and, in the next step, the bus bars 16*a* are connected to the electronic circuit arrangement 14 and the connection of the bus bars 16*a* to connection leads 22*a* which are fed to the electronic module 10 from the outside is carried out in the manner described with reference to the first embodiment example. Finally, the cover unit 68*a* is screwed to the connection unit 26*a*.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electronic module comprising:

a housing having an opening;

an electronic circuit arranged in the housing;

a substantially cylindrical bus bar connected to the electronic circuit, the bus bar having an axis and a radial dimension, the bus bar extending through the opening in the housing and having an end outside the housing;

a plate-like connection lug fixed to the end of the bus bar outside the housing, the connection lug having a radial dimension which exceeds the radial dimension of the bus bar;

a connection unit for providing a connection between the connection lug and an electrical lead, the connection unit comprising a base which contacts the housing, the base having an opening through which the connection lug is guided, the connection unit positively engaging the connection lug; and a closure element which secures the bus bar in position in the connection unit.

2. The electronic module of claim 1, further comprising a ring groove located around the opening of the housing and a seal received in the ring groove.

3. The electronic module of claim 2, wherein the ring groove is formed between the housing and the closure element.

4. The electronic module of claim 2, wherein the ring groove is formed between the housing and the connection lug.

5. The electronic module of claim 2, wherein the ring groove has a conical surface, the seal being radially compressed between the conical surface and the bus bar.

6. The electronic module of claim 1, wherein the connection lug extends substantially parallel to the axis of the bus bar.

7. The electronic module of claim 1, wherein the connection lug extends transversely to the axis of the bus bar.

8. The electronic module of claim 1, wherein the closure element is constructed as a bushing.

9. The electronic module of claim 1, wherein the closure element is constructed as a plate.

10. The electronic module of claim 1, wherein the closure element is one of a plurality of closure elements which are combined to form a closure unit.

11. The electronic module of claim 1, further comprising a fastener for connecting the connection lug to the electrical lead.

12. The electronic module of claim 11, wherein the fastener comprises a fastening element which is received by one of the connection unit and the connection lug and fixed against rotation with respect to the connection unit.

13. The electronic module of claim 11, wherein the connection lug has an opening through which the fastener is received.

14. The electronic module of claim 11, wherein the fastener is attached to the connection unit so that it cannot be removed from the connection unit.

15. The electronic module of claim 1, wherein the connection unit further comprises a mounting plate having a recess in which the connection lug is positively engaged.

16. The electronic module of claim 1, comprising a plurality of bus bars, the electronic module further comprising a plurality of dividing walls which insulate the bus bars from each other.

17. The electronic module of claim 1, further comprising a cover unit fitted to the connection unit and covering the connection lug.

18. The electronic module of claim 17, wherein the cover unit is sized to cover a plurality of connection lugs.

19. The electronic module of claim 1, wherein the housing comprises a removable housing cover which the base of the connection unit contacts, the opening of the housing being in the housing cover.

20. The electronic module of claim 1, wherein the connection unit is made of plastic.

* * * * *